US012072756B2

(12) United States Patent
Sridharan et al.

(10) Patent No.: US 12,072,756 B2
(45) Date of Patent: Aug. 27, 2024

(54) SCALABLE MACHINE CHECK ARCHITECTURE

(71) Applicant: Advanced Micro Devices, Inc., Santa Clara, CA (US)

(72) Inventors: Vilas K. Sridharan, Boxborough, MA (US); Dean A. Liberty, Nashua, NH (US); Magiting Talisayon, Boxborough, MA (US); Srikanth Masanam, Hyderabad (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 99 days.

(21) Appl. No.: 17/854,710

(22) Filed: Jun. 30, 2022

(65) Prior Publication Data

US 2024/0004744 A1 Jan. 4, 2024

(51) Int. Cl.
*G06F 11/00* (2006.01)
*G06F 11/07* (2006.01)
*G06F 11/14* (2006.01)
*G06F 12/02* (2006.01)

(52) U.S. Cl.
CPC ...... *G06F 11/0772* (2013.01); *G06F 11/0787* (2013.01); *G06F 11/1405* (2013.01); *G06F 12/0292* (2013.01)

(58) Field of Classification Search
CPC ............. G06F 11/0772; G06F 11/0787; G06F 11/1405; G06F 12/0292
See application file for complete search history.

(56) References Cited

U.S. PATENT DOCUMENTS

| | | | | |
|---|---|---|---|---|
| 2003/0074601 A1* | 4/2003 | Schultz | ............... | G06F 11/0706 714/E11.159 |
| 2011/0154128 A1* | 6/2011 | Rajkumari | .......... | G06F 11/0709 714/48 |
| 2015/0293854 A1* | 10/2015 | Kalamatianos | .... | G11C 29/4401 714/723 |
| 2018/0173644 A1* | 6/2018 | Koeberl | ............... | G06F 12/1416 |
| 2019/0205201 A1* | 7/2019 | Panda | .................... | G06F 11/079 |
| 2023/0195568 A1* | 6/2023 | Hong | .................... | G06F 11/073 714/764 |

* cited by examiner

*Primary Examiner* — Joshua P Lottich
(74) *Attorney, Agent, or Firm* — Kowert, Hood, Munyon, Rankin & Goetzel, P.C.; Rory D. Rankin (57) ABSTRACT

An apparatus and method for supporting communication during error handling in a computing system. A computing system includes a first partition and a second partition, each capable of performing error management based on a respective machine check architecture (MCA). When a host processor in the first partition detects an error that requires information from processor cores of the second partition, the host processor generates an access request with a target address pointing to a storage location in a memory of the second partition, not the first partition. When the host processor receives the requested error log information from the second partition, the host processor completes processing of the error. To support the host processor in generating the target address for the access request, during an earlier bootup operation, the second partition communicates the hardware topology of the second partition to the host processor.

20 Claims, 5 Drawing Sheets

SCALABLE MACHINE CHECK ARCHITECTURE

BACKGROUND

Description of the Relevant Art

In computing systems, multiple applications exploit parallel processing and large amounts of shared memory. Examples of these applications are machine learning applications, entertainment, and real-time applications, as well as some business, scientific, medical, and other applications. As computer memory storage and data bandwidth increase, so does the amount and complexity of data that organizations daily manage. To support multiple client computing devices running multiple various applications, an organization uses a distributed storage system. In some cases, such a system is a cluster of servers placed in one or more rooms of a building. The servers are connected to multiple peripheral devices, which can provide further computing capability.

When transferring information between functional blocks in the multiple semiconductor chips in the cluster of computing resources, electrical signals are sent on multiple, parallel metal traces, and these traces have transmission line effects such as distributed inductance, capacitance, and resistance throughout its length. For modern integrated circuits, the constantly decreasing widths of transistors and metal traces reduces signal integrity. In addition, as the operating voltage continues to decrease to reduce power consumption, the signal swing used for Boolean logic decreases as well as the noise margin. Therefore, the bit error rate in a computing system increases as the complexity increases and the manufacturing processes continue to advance. To improve reliability and reduce down time, error handling techniques are performed by the hardware. However, as the complexity of the computing system increases, the number of hardware topologies made available by separate components, such as the motherboard and cards providing access to peripheral devices, also increases. Communication for error handling among the separate components is no longer straightforward.

In view of the above, efficient methods and apparatuses for supporting communication during error handling are desired.

While the invention is susceptible to various modifications and alternative forms, specific implementations are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the scope of the present invention as defined by the appended claims.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention. Further, it will be appreciated that for simplicity and clarity of illustration, elements shown in the figures have not necessarily been drawn to scale. For example, the dimensions of some of the elements are exaggerated relative to other elements.

Apparatuses and methods for supporting communication during error handling in a computing system are contemplated. In various implementations, a computing system includes a host processor that assigns tasks to multiple partitions with each partition including one or more processing nodes. As used herein, a "processing node" is also referred to as a "node." A node includes one or more processors and local memory. In an implementation, the host processor is a central processing unit (CPU) in a first partition of the multiple partitions. In various implementations, each of two or more partitions of the multiple partitions performs error management based on a respective machine check architecture. For example, the first partition performs error management based on a first machine check architecture (MCA), and a second partition of the multiple partitions performs error management based on a second MCA different from the first MCA.

The hardware of the first partition supports the first MCA. For example, the hardware/circuitry of the first partition includes error detection and reporting circuitry distributed across the hardware components of the first partition such as other processor circuitry with multiple processor cores besides the host processor, other application specific integrated circuits (ASICs), controller and interface units, and so on. As used herein, in various implementations, the term "unit" refers to a circuit or circuitry. For example, an interface unit may be referred to as an interface circuit or interface circuitry. The hardware of the host processor provides banks of memory assigned to the different hardware components of the first partition. Particular banks of the assigned banks are reserved for particular error types. Threads of a process running on the hardware components are permitted to access particular banks. When an error occurs and circuitry of the hardware component detects the error, the hardware component stores error log information in the assigned banks. The hardware of the host processor also executes a base operating system that includes an exception handler that combined with the hardware of the first partition supports the machine check architecture (MCA) of the first partition.

The MCA defines the steps and techniques used by the first partition for detecting, reporting, and handling errors that occur in the computing system. Examples of the errors are translation lookaside buffer (TLB) errors, system bus errors, random access memory (RAM) storage errors, bit flipping errors, and so forth. In an implementation, the second partition of the multiple partitions includes multiple processors, each with multiple processor cores, of a compute accelerator. In an example, each of the multiple processors of the compute accelerator is a parallel data processing unit, and each of the multiple processor cores uses a relatively wide single instruction multiple data (SIMD) micro-architecture to achieve high throughput in highly parallel data applications. In some implementations, the nodes of the second partition are non-uniform memory access (NUMA) nodes utilizing the parallel data processing units to process parallel data tasks.

To detect errors in the computing system, the host processor performs queries, such as searching particular control registers to detect whether errors have occurred. These control registers are updated with error log information by other hardware components in the first partition. In some implementations, the control registers are machine-specific control registers implemented as flip-flop circuits with protected access. In other implementations, the control registers are machine-specific control registers implemented as regions of memory with protected access. Additionally, to detect errors in the computing system, other processors, cores, functional blocks, controllers, and so on, execute exception handlers that generate an exception and send the indications of an error to the host processor while also updating the control registers. These examples of circuitry (components) are considered "local," since they are located in a same partition as the host processor, which supports the first MCA. In contrast, the parallel data processing units of the second partition are considered "remote," since they are located in a different partition, such as the second partition, that supports the second MCA different from the first MCA.

In an implementation, the hardware components of the first partition are located on a motherboard, and the hardware components of the second partition are located on a card that is inserted in a slot or socket on the motherboard. In another implementation, the second partition is also located on the motherboard. In other implementations, the locations of the first partition and the second partition relative to the motherboard are set based on design requirements. In some implementations, the second partition does not include a host processor such as a CPU. In other implementations, the second partition does include a host processor such as a CPU. Typically, the first MCA supported by the first partition does not communicate with the second MCA supported by the second partition.

Typically, the first MCA supported by the first partition does not communicate with the second MCA supported by the second partition. However, an address translation unit of the first partition is used that bridges communication. When the host processor in the first partition detects an error that requires information from the remote processor cores of the second partition, the host processor generates an access request with a target address pointing to a storage location in a memory of the second partition, not the first partition. The access request requests error log information from the second partition to be used for error processing by the host processor of the first partition. When the host processor receives the requested error log information from the second partition, the host processor completes processing of the error. For example, the host processor corrects the error and/or the host processor sends error log information to system memory. To support the host processor in generating the target address for the access request, during an earlier bootup operation, the second partition communicates the hardware topology of the second partition to the host processor. This communication also includes identification of the regions of memory in the second partition assigned to processor cores of the second partition to be used for storing error log information. Further details are provided in the following discussion.

Figure 1:
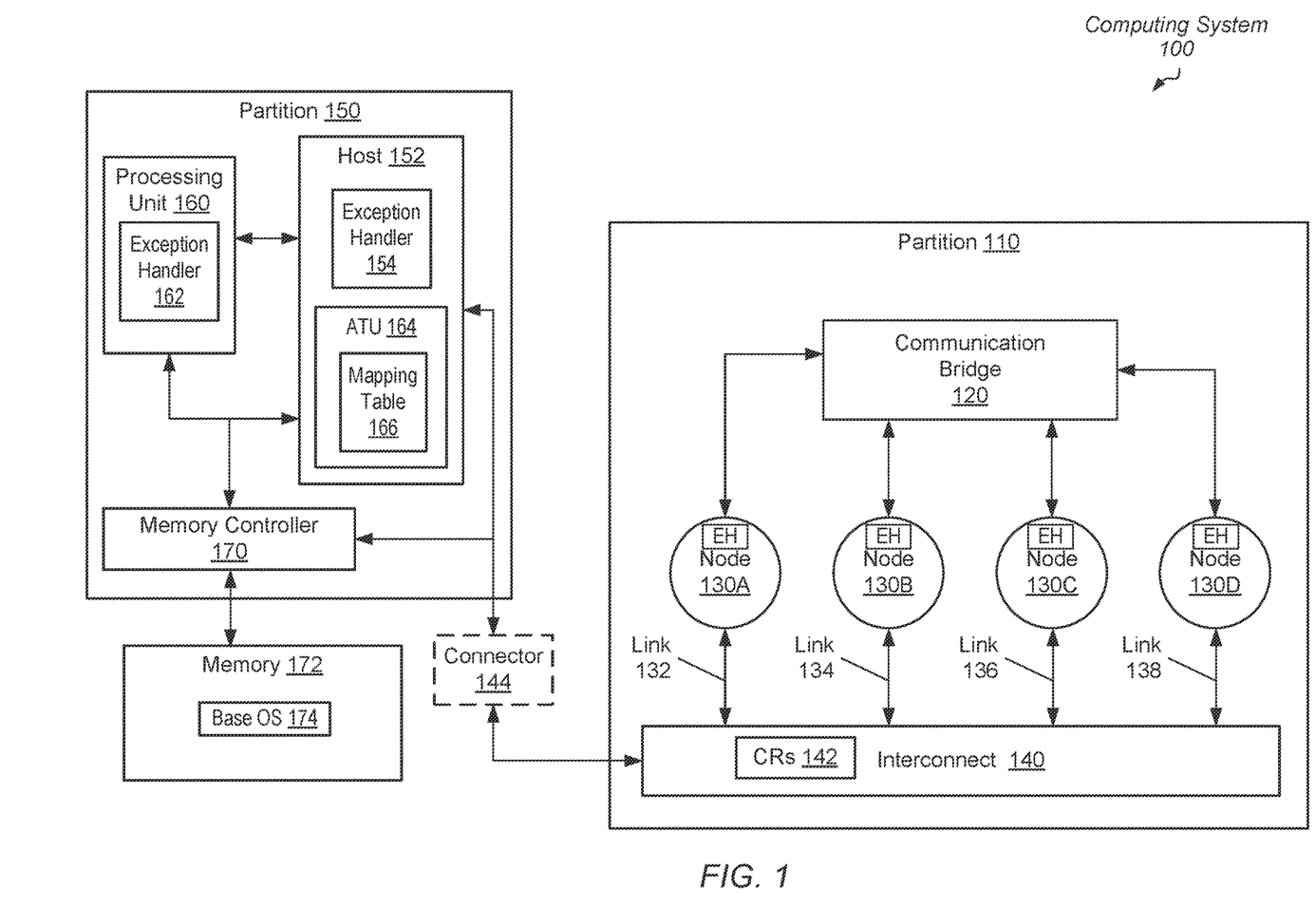
FIG. 1 is a generalized block diagram of a computing system.

Turning now to FIG. 1, a generalized block diagram is shown of one implementation of a multi-node computing system 100. In the illustrated implementation, the computing system 100 includes the partition 150, the partition 110, and the memory 172. In some implementations, the computing system also includes the connector 144 to support data transfer between the partitions 110 and 150. In one implementation, the partition 150 includes components on a motherboard, the connector 144 is a slot or a socket on the motherboard, and the partition 150 is a card inserted in the connector 144. In another implementation, each of the partitions 110 and 150 is included on the motherboard, and the partitions 110 and 150 communicate with one another through metal traces on the motherboard. In such an implementation, a slot or socket type connector 146 is not used for communication between the partitions. In other implementations, the locations of the partition 110 and the partition 150 relative to the motherboard are set based on design requirements. In various implementations, each of the partitions 110 and 150 performs error management based on a respective machine check architecture.

In an implementation, the partition 150 is a system on a chip (SoC). In other implementations, the partition 150 is a multi-chip module (MCM). The host processor 152 of the partition 150 transfers commands, messages, and payload data with the partition 110 via at least the interconnect 140. In some designs, the host processor 152 is a general-purpose central processing unit (CPU) capable of executing instructions of a particular instruction set architecture (ISA). The processing unit 160 of the partition 150 is representative of a variety of types of integrated circuits such as another general-purpose processor core or unit, an applications specific integrated circuit (ASIC), a digital signal processor (DSP), or other. Although a single memory controller 170 is shown, in other implementations, another number of memory controllers are used in computing system 100. In various implementations, memory controller 170 receives memory requests from one or more of the host processor 152, the processing unit 160, and the partition 110, and schedules the memory requests using arbitration logic, and sends the scheduled memory requests to memory 172.

In an implementation, memory 172 is system memory for the computing system 100, and memory 172 is one of a variety of dynamic random access memory (DRAM) with a corresponding communication protocol supported by the memory controller 170. The communication protocol determines values used for information transfer, such as a number of data transfers per clock cycle, signal voltage levels, signal timings, signal and clock phases and clock frequencies. In some implementations, the computing system 100 is also connected to main memory, which is a lower level than the system memory 172 in a hierarchical memory subsystem. This main memory in the lower level than the system memory 172 is implemented with one of a variety of types of non-volatile, random access secondary storage of data. Examples of main memory are hard disk drives (HDDs) and solid-state disks (SSDs).

The partition 110 includes multiple processing nodes 130A, 130B, 130C and 130D (or nodes 130A-130D). Although four nodes 130A-130D are shown, in other designs, another number of nodes are used. The partition 110 also includes the communication bridge 120, the links 132-138, and the interconnect 140. Power controllers, interrupt controllers, network interfaces, phased locked loops (PLLs) or other clock generating circuitry, and cooling systems with fans are not shown for ease of illustration. In some implementations, each of the nodes 130A-130D includes one or more processors, local memory, a power controller, and so on.

In some designs, the nodes 130A-130D are non-uniform memory access (NUMA) nodes utilizing parallel data processors to process tasks. Each of the parallel data processors uses a relatively wide single instruction multiple data (SIMD) micro-architecture to achieve high throughput in highly parallel data applications. Each data element is processed independently of other data elements, but the same sequence of operations is used. The high parallelism offered by the hardware of the parallel data processors of the nodes 130A-130D is used for simultaneously processing the multiple data elements of the scientific, medical, finance, encryption/decryption, and other computations.

In various implementations, the partition 110 is a peripheral device of the partition 150. As used herein, the term "peripheral device" refers to a hardware device for providing particular functionality, which offloads a particular processor, such as the host processor 152 of the partition 150, allowing this particular processor to do other tasks. As used herein, the term "compute accelerator" refers to a hardware device that provides accelerated data processing, or higher throughput, of particular types of tasks. In an implementation, the partition 110 is a compute accelerator that provides high throughput of highly parallel data applications. In such an implementation, each of the nodes 130A-130D is a parallel data processor used in the compute accelerator. In an implementation, the computing system 100 is an exascale computing system that uses the compute accelerator (partition 110) to provide performance at a level of one exaflop. An "exaflop" is a billion billion calculations per second ($10^{18}$ calculations per second). In one implementation, the partition 110 is a multi-chip module (MCM) placed in a socket or slot (connector 144) of a multi-socket motherboard in a desktop computer or a server.

In various implementations, the nodes 130A-130D are connected to one another by the communication bridge 120 and/or by the interconnect 140 via the links 132-138. The nodes 130A-130D are connected to the memory controller 170 via the interconnect 140 and the connector 144 when it is used in the computing system 100. The communication bridge 120 supports direct communication between the nodes 130A-130D without transferring signals on the motherboard. In various implementations, interconnect 140 supports communication using point-to-point, packet-based, bus-based, including shared bus configurations, crossbar configurations, and hierarchical buses with bridges. In some implementations, interconnect 140 utilizes a communication fabric (or fabric).

Although a single line is shown to represent each of the links 132-138, each of the links 132-138 includes multiple lines, or physical wires or lanes, capable of transferring data as signals. Link interfaces across the computing system 100 and interconnect 140 support one or more communication protocols for transferring commands and data. Similar to the memory communication protocol, the supported communication protocols of interconnect 140, the connector 144, and other interfaces determine values such as a number of data transfers per clock cycle, signal voltage levels, signal timings, signal and clock phases and clock frequencies.

In some implementations, link interfaces across the computing system 100 and interconnect 140 includes queues for storing requests and responses, and selection logic implemented by hardware circuits capable of arbitrating between received requests before sending requests across interconnect 140. Interconnect 140 also includes circuitry capable of building and decoding packets, and selecting routes for the packets. Interconnect 140 transfers data, such as requests, responses, commands, messages, and payload data, back and forth between the partition 110 and the host processor 152 and the memory controller 170.

The hardware, such as the circuitry, of the host processor 152 executes a base operating system (OS) 174. The base OS 174 includes the exception handler 154 that together with the hardware distributed across the partition 150 supports a local machine check architecture (MCA). The local MCA defines the steps and techniques used by the exception handler 154 and the hardware distributed across the partition 150 for detecting, reporting, and handling errors that occur in the computing system. Examples of the errors are translation lookaside buffer (TLB) errors, system bus errors, random access memory (RAM) storage errors, bit flipping errors, and so forth. Components that include hardware in the partition 150 run an exception handler that sends messages to the host processor 152 for reporting errors, or store messages in a particular location that the host processor 152 queries during particular sampling intervals. For example, the host processor 152 runs the exception handler 154 and the processing unit 160 runs the exception handler 162. It is possible and contemplated that the memory controller 170 also runs an exception handler in order to participate in the local MCA that is supported by the hardware of the partition 150.

To detect errors in the computing system 100, the host processor 152 performs queries such as searching particular control registers (not shown) to detect whether errors have occurred. These queries are steps of the local MCA. Based on the local MCA, other processors, cores, functional blocks, controllers, and other types of circuitry of the partition 150 detect errors and send error log information to particular registers of these control registers, which are queried later by the host processor 152. In some implementations, the control registers are machine-specific control registers implemented as flip-flop circuits with protected access. In other implementations, the control registers are machine-specific control registers implemented as regions of memory 172 with protected access.

Additionally, to detect errors in the computing system 100, the other processors, cores, functional blocks, controllers, and other types of circuitry, such as at least processing unit 160, execute exception handlers that generate an exception and send the indications of an error directly to the host processor 152, rather than to control registers for storage. Generating exceptions in this manner is based on the local MCA.

The multiple nodes 130A-130D of the partition 110 support a remote MCA that is different from the local MCA supported by the partition 150. For example, at least the nodes 130A-130D run an exception handler (EH) in the partition 110. Typically, the local MCA of the partition 150 does not communicate with the remote MCA of the partition 110. Therefore, errors that are detected in the partition 110 typically do not cause the components of the partition 110 to directly send error log information to the host processor 152. Similarly, errors that are detected in the partition 110 typically do not cause the components of the partition 110 to store error log information in particular control registers accessible by the host processor 152. The host processor 152 is unaware of the locations of these control registers of the partition 110. Similarly, the multiple nodes 130A-130D of the partition 110 are unaware of storage locations accessible by the host processor 152. Therefore, the local MCA of the partition 150 and the remote MCA of the partition 110 are different based at least upon the use of different control registers where the storage locations of these control registers are known to only one of the local MCA and the remote MCA. However, in various implementations, an address translation unit (ATU) 164 is used that bridges communication between the local MCA of the partition 150 and the remote MCA of the partition 110. The ATU 164 can be standalone circuitry or circuitry located within a preexisting processor core or functional block.

When the host processor 152 in the partition 150 detects an error that requires information from the remote processor cores of the nodes 130A-130D, the host processor 152 generates an access request with a target address pointing to a storage location in a memory of the partition 110, not the partition 150. The access request requests error log information from a remote processor core of the nodes 130A-130D to be used for error processing by the host processor 152 of the partition 150. To support generating the target address, the host processor 152 relies on the ATU 164. Without the ATU 164, the host processor 152 would be unable to detect an error that requires information from the remote processor cores of the nodes 130A-130D, and the host processor 152 would be unable to determine the target address pointing to a storage location in a memory of the partition 110, not the partition 150.

The host processor 152 either sends the access request directly to the circuitry of the ATU 164, or the ATU 164 intercepts access requests generated by the host processor 152. In some implementations, the mapping table 166 stores address translations between local MCA memory storage locations (of partition 150) and remote MCA memory storage locations (of partition 110). In various implementations, the mapping table 166 is stored in secure memory. In other implementations, the mapping table 166 is located in on-die registers of the host processor 152, in a cache of the host processor 152 that belong to a cache memory subsystem, or other. In an implementation, the original target address generated by the host processor 152 indicates a remote storage location to the ATU 164 and that the access request should be sent to the partition 110. In one implementation, a subset of the upper bits of the original target address provides the indication.

In various implementations, the base OS 174 is unaware of the additional address translation steps and the step of sending the access request to the partition 110. For example, the MCA of the partition 150 uses banks of memory assigned to the different hardware components of the partition 150. Particular banks of the assigned banks are reserved for particular error types. Threads of a process running on the hardware components are permitted to access particular banks. When an error occurs and the hardware component detects the error, the hardware component stores error log information in the assigned banks. A subset of the banks of the assigned bank, though, are actually reserved for remote hardware components such as the nodes 130A-130D of partition 110. Although the base OS 174 is aware of the nodes 130A-130D of partition 110 for assigning tasks of applications, the base OS 174 is unaware of the reserved banks of memory for storing error log information corresponding to the nodes 130A-130D of partition 110. However, the exception handler 154 executed by circuitry of the host processor 152 and the circuitry of the ATU 164 are aware of the topology of the nodes 130A-130D of partition 110 and the corresponding assignments to the memory banks for reporting error log information.

When the ATU 164 determines the access request is directed toward remote circuitry, such as the nodes 130A-130D of partition 110, the ATU 164 accesses the mapping table 166, and generates a new target address. This new target address points to a data storage location in the partition 110 that is accessible by a corresponding one of the nodes 130A-130D. The ATU 164 inserts this new target address in the access requests. Alternatively, the ATU 164 simply replaces the previous (original) target address with the new target address. In some implementations, the mapping table 166 also stores a connector identifier such as a socket identifier, a slot identifier, or other that identifies the connector 144. This identifier is used to transfer the access request after address translation has completed.

Later, the partition 110 sends the requested error log information to the partition 150, and this information is stored in a particular storage location. In an implementation, this information is stored in the memory bank pointed to by the original target address. The exception handler 154 of the host processor 152 is made aware that the requested error log information is made available. When the host processor 152 receives the requested error log information, the host processor 152 completes processing of the error. For example, the host processor 152 performs one or more steps to correct the error and/or the host processor 152 sends error log information to system memory 172. To support the host processor 152 with processing errors reported by a remote MCA, such as the MCA run by the partition 110, in various implementations, during a bootup operation, firmware that is run by the host processor 152 (with the base OS 174 being unaware) or by other circuitry builds the mapping table 166. Additionally, this firmware builds mappings stored in the configuration registers (CRs) 142 of the partition 110. This communication also includes identification of the regions of memory in the partition 110 assigned to processor cores of the nodes 130A-130D to be used for storing error log information.

Figure 2:
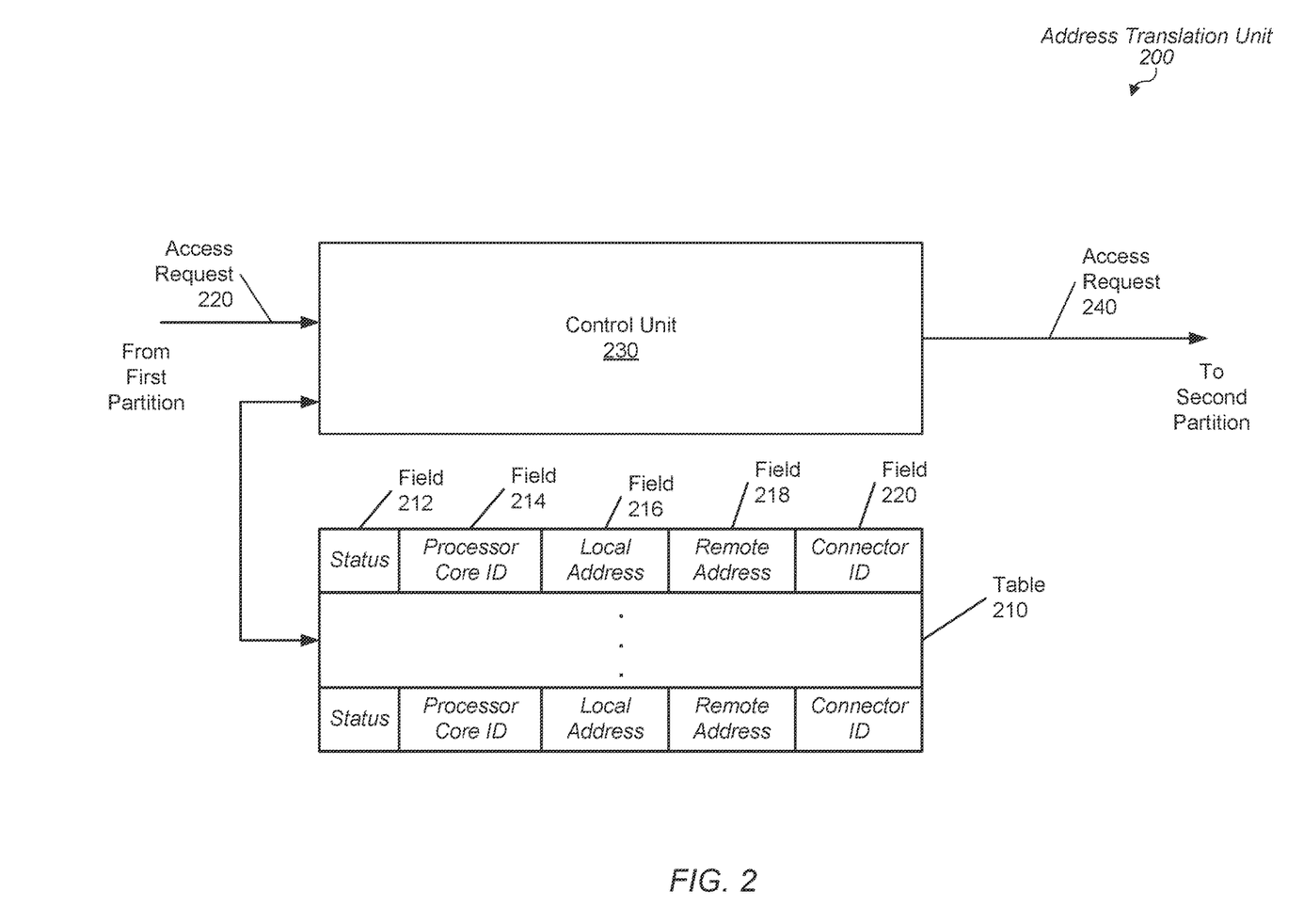
FIG. 2 is a generalized block diagram of an address translation unit.

Referring to FIG. 2, a generalized block diagram is shown of an address translation unit 200. As shown, the address translation unit 200 includes the table 210 and the control unit 230. In some implementations, the table 210 and the control unit 230 are placed on separate functional blocks or dies. In other implementations, the table 210 and the control unit 230 are located together. The table 210 includes multiple table entries (or entries), each storing information in multiple fields such as at least fields 212-220. The table 210 is implemented with one of flip-flop circuits, a random access memory (RAM), a content addressable memory (CAM), or other. In some implementations, the information of the table 210 is stored in secure memory.

Although particular information is shown as being stored in the fields 212-220 and in a particular contiguous order, in other implementations, a different order is used and a different number and type of information is stored. As shown, field 212 stores status information. An example of the status information is an indication of whether the address mapping is between local addresses or between a local address and a remote address. A local address is an address pointing to a storage location accessible by a hardware component that supports a local MCA. A remote address is an address pointing to a storage location accessible by a hardware component that supports a remote MCA different from the local MCA. The field 214 stores a processor core identifier (ID) that specifies a processor core (or functional block or other hardware component) assigned to handle information collection, error handling, or other tasks corresponding to the local MCA address stored in field 216. The local MCA address points to one of a variety of machine-specific registers or memory banks used in the local MCA.

The field 218 stores a remote MCA address that points to a storage location in a remote partition, such as a remote peripheral device, with hardware components that support the remote MCA different from the local MCA. The field 220 stores a connector ID that specifies which slot or socket on the mother board to use for sending an access request.

The control unit 230 receives the access request 220 from the host processor or from an intermediate functional block providing a communication hop in the transmission of the access request 220. In an implementation, the control unit accesses the table 210 based on a local MCA address (original target address) of the access request 220, and the control unit 230 determines from the table access whether the access request 220 is directed to a local storage location or a remote storage location. In another implementation, the circuitry of the control unit 230 determines from particular bits of the local MCA address (original target address) of the access request 220 whether the access request 220 is directed to a local storage location or a remote storage location. If the control unit 230 determines the access request 220 is directed to a remote storage location, then the control unit 230 indexes into the table 210 with one or more portions of the access request 220. Therefore, depending on the implementation, the control unit 230 is capable of performing conditional accesses of the table 210 or unconditional accesses of the table 210. The control unit 230 performs any address translations needed for the access request 220, and the control unit 230 is capable of inserting into the access request the processor core ID of a remote processor from field 214, the remote address from field 218, and connector ID from field 220 (if needed). Modifying the access request 220 as such generates the access request 240 to send to its intended destination.

Figure 3:
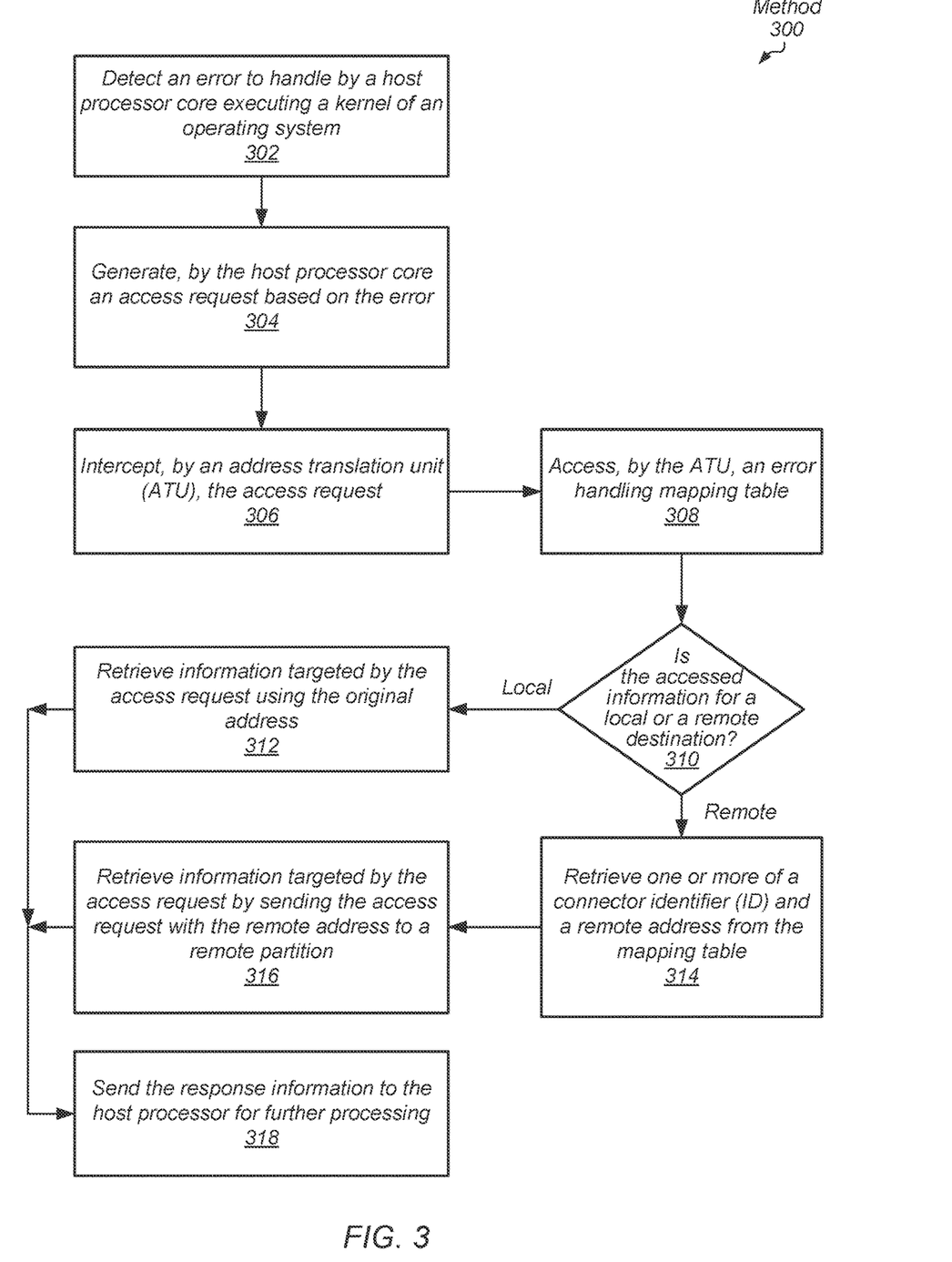
FIG. 3 is a generalized block diagram of a method for supporting communication during error handling in a computing system.

Referring to FIG. 3, a generalized block diagram is shown of a method 300 for supporting communication during error handling in a computing system. For purposes of discussion, the steps in this implementation (as well as in FIG. 4) are shown in sequential order. However, in other implementations some steps occur in a different order than shown, some steps are performed concurrently, some steps are combined with other steps, and some steps are absent. A host processor core detects an error to handle while executing a kernel of an operating system (block 302). To detect errors in the computing system, the host processor performs queries, such as searching particular control registers to detect whether errors have occurred. Additionally, to detect errors in the computing system, other processors, cores, functional blocks, controllers, and so on, execute exception handlers that generate an exception and send the indications of an error to the host processor. The host processor core generates an access request based on the error (block 304). An address translation unit (ATU) intercepts the access request (block 306). In some implementations, the ATU is circuitry within the host processor. The ATU accesses an error handling mapping table (block 308).

If the ATU determines that the accessed information is for a local destination ("local" branch of the conditional block 310), then the ATU sends the access request to other circuitry for retrieving information targeted by the access request using the original target address (block 312). For example, the original target address points to a memory bank assigned to a particular thread that was operating on a particular processor core. The targeted information is error log information stored in the memory bank. The ATU or other circuitry of the host processor obtains this requested error log information stored in the memory bank.

If the ATU determines that the accessed information of the mapping table is for a remote destination ("remote" branch of the conditional block 310), then the ATU retrieves, from the mapping table, one or more of a connector identifier (ID) and a remote address from the mapping table (block 314). The ATU can also retrieve a processor core ID of a remote processor core. The ATU retrieves information targeted by the access request by sending the modified access request with at least the remote address to a remote partition (block 316). In some implementations, the ATU sends the modified access request to a connector specified by the connector ID. Regardless of whether the requested information was retrieved locally or remotely, the ATU or other circuitry sends the response information to the host processor for further processing (block 318).

Figure 4:
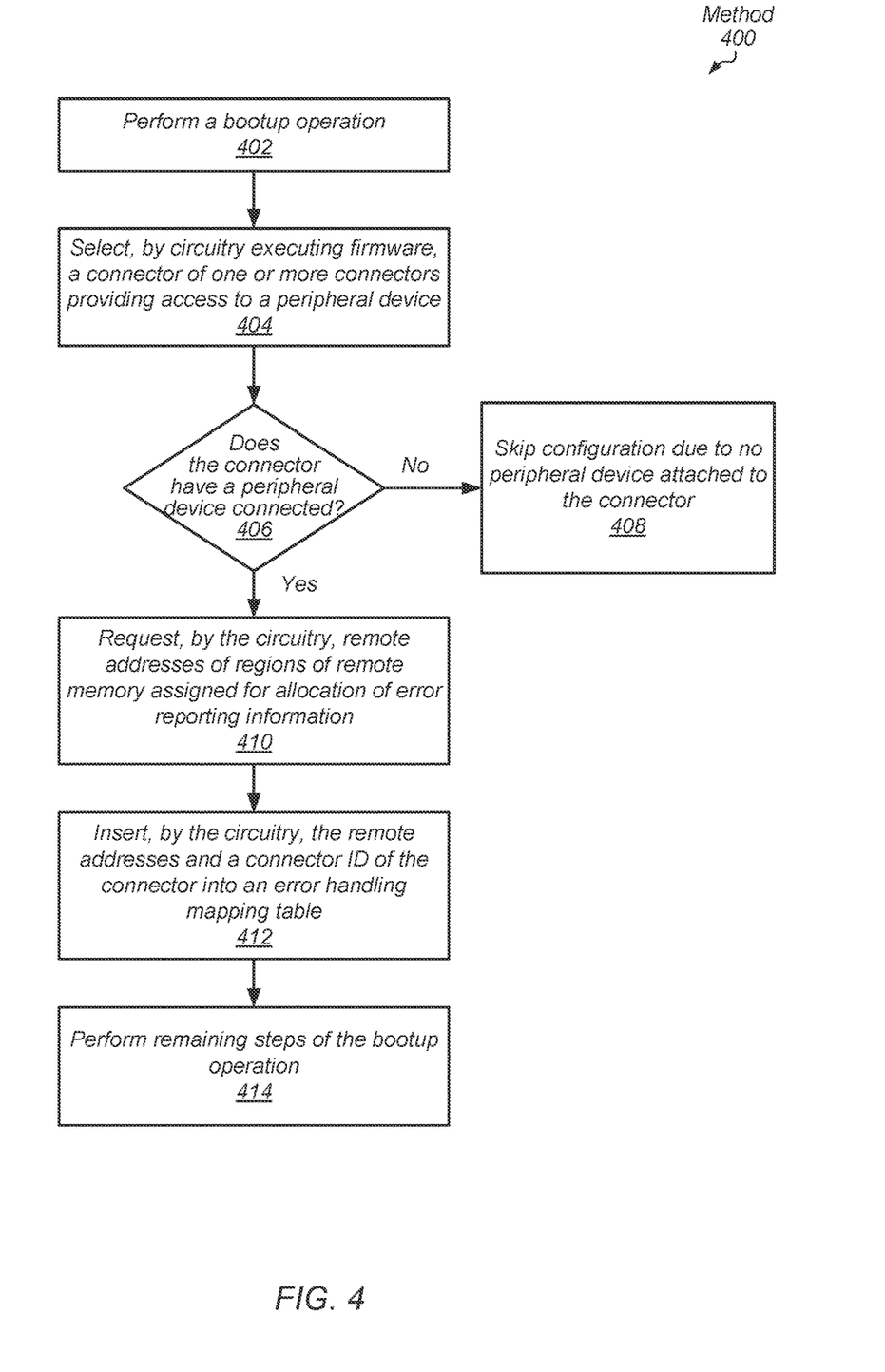
FIG. 4 is a generalized block diagram of a method for supporting communication during error handling in a computing system.

Turning now to FIG. 4, a generalized block diagram is shown of a method 400 for supporting communication during error handling in a computing system. Circuitry of a processor core executes firmware that performs a bootup operation (block 402). The processor core selects a connector of one or more connectors providing access to a peripheral device (block 404). If the processor core determines that the connector does not have a peripheral device connected ("no" branch of the conditional block 406), then the processor core skips configuration of an external peripheral device due to no peripheral device being attached to the connector (block 408).

If the processor core determines that the connector has a peripheral device connected ("yes" branch of the conditional block 406), then the processor core requests remote addresses of regions of remote memory assigned for allocation of error reporting (error log) information (block 410). The processor core inserts the remote addresses and a connector ID of the connector into an error handling mapping table (block 412). The processor core performs remaining steps of the bootup operation (block 414). It is noted that in some implementations, a remote partition does not include a peripheral device, but rather, includes a partition on a motherboard with a local partition that uses the processor core. The remote partition runs a remote MCA different from the local MCA of the processor core that performs the steps of the bootup operation. No connector is used, but the local partition that performs the bootup operation is aware of the remote partition, and still performs the steps of blocks 410-414 for the remote partition.

Figure 5:
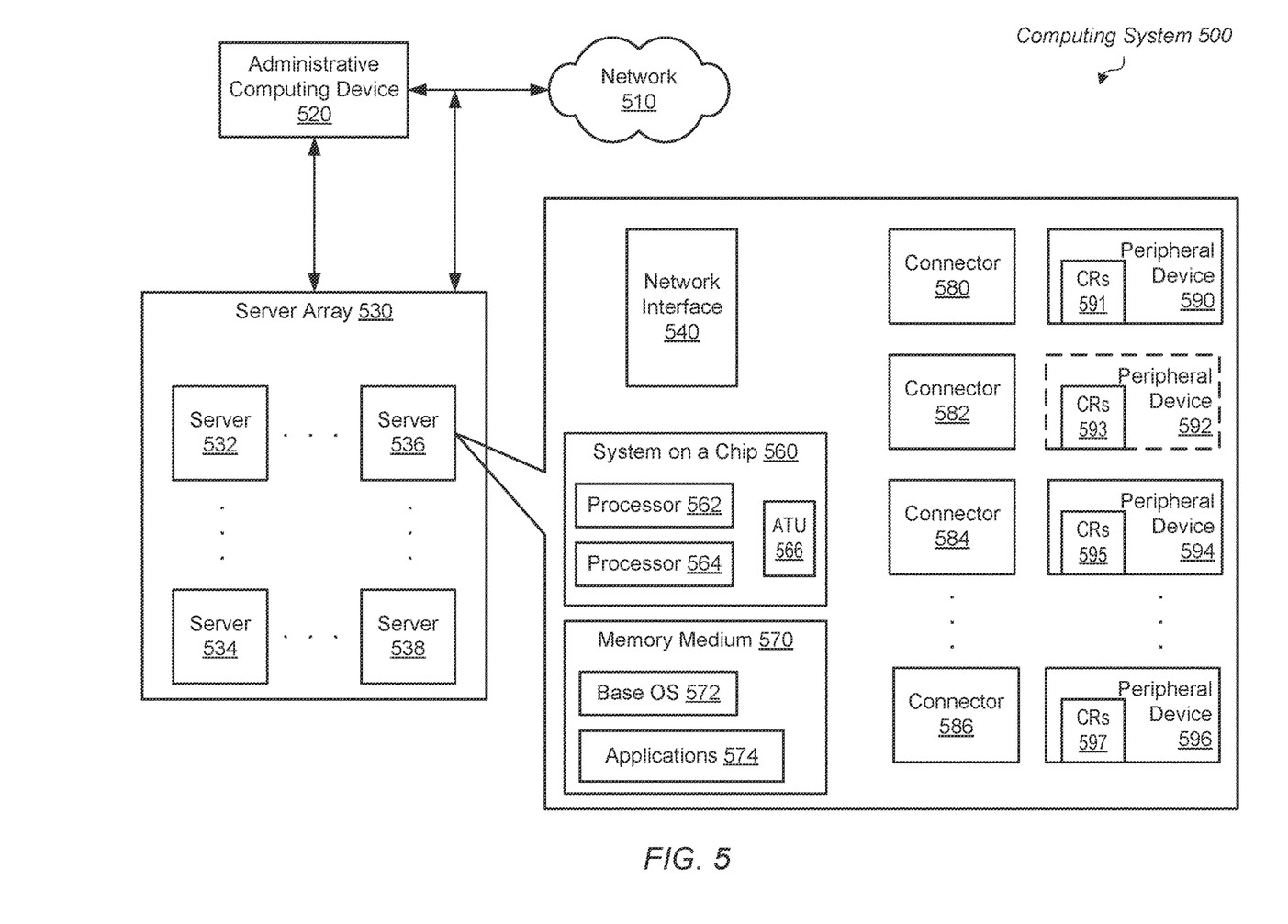
FIG. 5 is a generalized block diagram of a computing system.

Referring to FIG. 5, a generalized block diagram of one implementation of a computing system 500 is shown. As shown, the computing system 500 includes the server array 530 that uses multiple servers 532-538 that are interconnected to one another. The server array 530 is also connected to client computer systems (not shown) via at least the network 510. A system administrator or other user manages the server array 530 using the administrative computing device 520 (or computing device 520). The computing device 520 is any of a variety of computing devices such as a desktop computer, a laptop computer, a tablet computer, a smartphone, and so on. In an implementation, the server array 530 is a grid of a relatively high number of servers 532-538 such as hundreds, thousands, or tens of thousands of server computers (or servers).

In some implementations, the server array 530 is a cluster or grid of servers that are grouped into what is referred to as a "server farm." The server farm includes one or more server arrays such as server array 530. In an implementation, the server farm is used as an exascale computing system, and each of the peripheral devices 590, 592, 594 and 596 of the server farm includes multiple parallel data processing units to provide a high-performance compute accelerator. Due to the high number of servers 532-538 in the server array 530, the computing device 520 uses automated management applications. Additionally, it is possible that multiple external users and companies share access of the server array 530, and the computing device 520 also runs security applications. In some implementations, the applications for the automated management and the security management are run on multiple computing devices with secure access by the system administrator.

As shown, similar to the other servers 532, 534 and 538 of the server array 530, the server 536 includes at least the multiple components 540-596. The network interface 540 includes hardware, such as circuitry, for supporting a communication protocol that enables communication with the network 510. The network interface 540 includes one or more queues for storing requests, responses, and messages. The circuitry of the network interface 540 also builds packets for transmitting to the network 510, and disassembles packets received from network 510. The functionality of network interface 540 can be included on a network adapter card. The system on a chip (SoC) 560 includes a variety of processing units and functional blocks providing a variety of functionalities such as at least processors 562-564. For example, in some implementations, the SoC 560 includes one or more of a central processing unit (CPU) with circuitry used for processing instructions of a selected instruction set architecture (ISA), one or more application specific integrated circuits (ASICs) or microcontrollers, and so on. It is noted that the SoC 560 includes an address translation unit (ATU) 566, which has the same functionality as the ATU 164 and the mapping table 166 (of FIG. 1) and the ATU 200 (of FIG. 2). It is also noted that the peripheral devices 590, 592, 594 and 596 include the configuration registers (CRs) 591, 593, 595 and 597, which store the same type of mapping information as the CRs 142 (of FIG. 1).

The memory medium 570 is one of variety of types of a hard disk drive (HDD) and stores a base operating system (OS) 572, one or more applications 574, and data (not shown). The server 536 also includes multiple connectors 580-586. In some implementations, each of the connectors 580-586 provides an interface such as a socket or a slot on a motherboard of the server 536. The peripheral devices 590-596 transfer data with semiconductor chips on the motherboard of the server 536 through the connectors 580-586. Each of the connectors 580-586 includes multiple pins. A particular type of signal of multiple signal types is transmitted on a particular pin of the multiple pins based on a predetermined assignment. This assignment, or mapping, of the multiple signal types to the multiple pins is defined by a particular communication protocol used to transfer data through one of the connectors 580-586. In addition, the physical size and placement of the pins are set by what is referred to as a "form factor" of a connector of the connectors 580-586. The form factor is the specified mechanical properties of a connector of the connectors 580-586 such as the length and the width of the connector, the number of pins of the connector, the placement and spacing of the pins, and so forth. In some implementations, a cable is used to transfer data between the motherboard of the server 536 and one of the peripheral devices 590-596. The physical traits of the cable end that is inserted into a connector of the connectors 580-586 are determined by the form factor of the connector of the connectors 580-586. Although the SoC 560 runs a local MCA different from remote MCAs of the peripheral devices 590-596, the local MCA and the remote MCAs are able to communicate based at least in part on the functionality of the ATU 566.

It is noted that one or more of the above-described implementations include software. In such implementations, the program instructions that implement the methods and/or mechanisms are conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer.

For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media further includes volatile or non-volatile memory media such as RAM (e.g., synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g., Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, in various implementations, program instructions include behavioral-level descriptions or register-transfer level (RTL) descriptions of the hardware functionality in a high level programming language such as C, or a design language (HDL) such as Verilog, VHDL, or database format such as GDS II stream format (GDSII). In some cases, the description is read by a synthesis tool, which synthesizes the description to produce a netlist including a list of gates from a synthesis library. The netlist includes a set of gates, which also represent the functionality of the hardware including the system. The netlist is then placed and routed to produce a data set describing geometric shapes to be applied to masks. The masks are then used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the implementations above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
 a processing circuit; and
 circuitry configured to perform, based on a first machine check architecture, error management together with the processing circuit; and
 wherein, in response to processing an error, the processing circuit is configured to generate a target address of an access request, wherein the target address identifies a storage location in a memory of a remote partition configured to perform error management based on a second machine check architecture different from the first machine check architecture.

2. The apparatus as recited in claim 1, wherein the processing circuit is further configured to send the access request with the target address to the remote partition.

3. The apparatus as recited in claim 2, wherein the processing circuit is further configured to complete processing of the error, in response to receiving error log information from the remote partition.

4. The apparatus as recited in claim 2, wherein the processing circuit of the apparatus is further configured to assign parallel data tasks to the remote partition that comprises a plurality of processing circuits of a compute accelerator.

5. The apparatus as recited in claim 2, wherein in response to performing a bootup operation, the processing circuit is configured to generate a mapping table that stores address mappings between local addresses pointing to storage locations that are accessible by the processing circuit and remote addresses pointing to storage locations that are accessible by a plurality of processing circuits of the remote partition.

6. The apparatus as recited in claim 5, wherein the processing circuit is further configured to execute a kernel of a base operating system of the apparatus.

7. The apparatus as recited in claim 5, wherein the mapping table stores a connector identifier along with the address mappings, wherein the connector identifier identifies a connector that couples the processing circuit to the remote partition.

8. A method, comprising:
 processing tasks of an application by a processing circuit;
 performing, based on a first machine check architecture, error management by circuitry together with the processing circuit; and
 in response to processing an error, generating, by the processing circuit, a target address of an access request pointing to a storage location in a memory of a remote partition configured to perform error management based on a second machine check architecture different from the first machine check architecture.

9. The method as recited in claim 8, further comprising sending, by the processing circuit, the access request with the target address to the remote partition.

10. The method as recited in claim 9, further comprising completing processing of the error, by the processing circuit, in response to receiving error log information from the remote partition.

11. The method as recited in claim 9, further comprising assigning, by the processing circuit, parallel data tasks to the remote partition that comprises a plurality of processing circuits of a compute accelerator.

12. The method as recited in claim 9, wherein in response to performing a bootup operation, the method further comprises generating, by the processing circuit, a mapping table that stores address mappings between local addresses pointing to storage locations that are accessible by the processing circuit and remote addresses pointing to storage locations that are accessible by a plurality of processing circuits of the remote partition.

13. The method as recited in claim 12, further comprising executing, by the processing circuit, a kernel of a base operating system.

14. The method as recited in claim 12, further comprising storing, by the mapping table, a connector identifier along with the address mappings, wherein the connector identifier identifies a connector that couples the processing circuit to the remote partition.

15. A computing system comprising:
 a server comprising:
  a first partition configured to perform error management based on a first machine check architecture; and
  a second partition configured to perform error management based on a second machine check architecture different from the first machine check architecture; and
  wherein each of the first partition and the second partition is configured to process tasks of an application; and
  wherein, in response to processing an error detected in the first partition, a processing circuit of the first partition is configured to generate a target address of an access request pointing to a storage location in a memory of the second partition.

16. The computing system as recited in claim 15, wherein the processing circuit is further configured to send the access request with the target address to the second partition.

17. The computing system as recited in claim 16, wherein the processing circuit is further configured to complete processing of the error, in response to receiving error log information from the second partition.

18. The computing system as recited in claim 16, wherein the processing circuit of the first partition is further configured to assign parallel data tasks to the second partition that comprises a plurality of processing circuits of a compute accelerator.

19. The computing system as recited in claim 16, wherein in response to performing a bootup operation, circuitry of the first partition is configured to generate a mapping table that stores address mappings between local addresses accessible by the processing circuit of the first partition and remote addresses that are accessible by a plurality of processing circuits of the second partition.

20. The computing system as recited in claim 19, wherein the processing circuit is further configured to execute a kernel of a base operating system.

* * * * *